(12) United States Patent
Tudeau et al.

(10) Patent No.: US 11,942,616 B2
(45) Date of Patent: Mar. 26, 2024

(54) STRUCTURE FOR HEAT TREATMENT OF AN ELECTRICAL STORAGE DEVICE FOR A MOTOR VEHICLE

(71) Applicant: Valeo Systemes Thermiques, Le Mesnil Saint Denis (FR)

(72) Inventors: Eric Tudeau, La Suze sur Sarthe (FR); Frédéric Tison, La Suze sur Sarthe (FR); Jean Damien Muller, La Suze sur Sarthe (FR); Antonio Figueiredo, La Suze sur Sarthe (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 915 days.

(21) Appl. No.: 16/956,192

(22) PCT Filed: Dec. 20, 2018

(86) PCT No.: PCT/FR2018/053450
§ 371 (c)(1),
(2) Date: Sep. 11, 2020

(87) PCT Pub. No.: WO2019/122744
PCT Pub. Date: Jun. 27, 2019

(65) Prior Publication Data
US 2021/0126303 A1 Apr. 29, 2021

(30) Foreign Application Priority Data
Dec. 20, 2017 (FR) ...................................... 1762572

(51) Int. Cl.
*B60K 11/00* (2006.01)
*B60K 11/02* (2006.01)
(Continued)

(52) U.S. Cl.
CPC ......... *H01M 10/6556* (2015.04); *B60K 11/02* (2013.01); *B60K 2001/005* (2013.01); *H01M 10/625* (2015.04)

(58) Field of Classification Search
CPC . B60K 11/02; B60K 2001/005; H01M 10/625
(Continued)

(56) References Cited

U.S. PATENT DOCUMENTS 2,410,952 A * 11/1946 Lighton ............... H01M 10/615
165/905
4,210,127 A * 7/1980 Kleine .................. F24S 10/504
165/170
(Continued)

FOREIGN PATENT DOCUMENTS

CN         2677852 Y       2/2005
CN       101846471 A       9/2010
(Continued)

OTHER PUBLICATIONS

Office Action in corresponding Chinese Application No. 201880089462. 1, dated Mar. 31, 2023 (8 pages).
(Continued)

*Primary Examiner* — Hau V Phan
(74) *Attorney, Agent, or Firm* — Osha Bergman Watanabe & Burton LLP

(57) ABSTRACT

Structure (1) for the heat treatment of an electrical storage device (2) for a motor vehicle, the structure (1) including at least one heat exchange plate (10, 11, 12) intended to be in contact with the electrical storage device (2) and having a thickness (5) defined by two external surfaces (3, 4), the heat exchange plate (10, 11, 12) comprising at least one channel (6, 61, 62) formed in its thickness (5) and opening at at least one end (7) into the thickness (5) of the heat exchange plate (10, 11, 12), characterized in that, at the level of the end (7)
(Continued)

Figure 1:
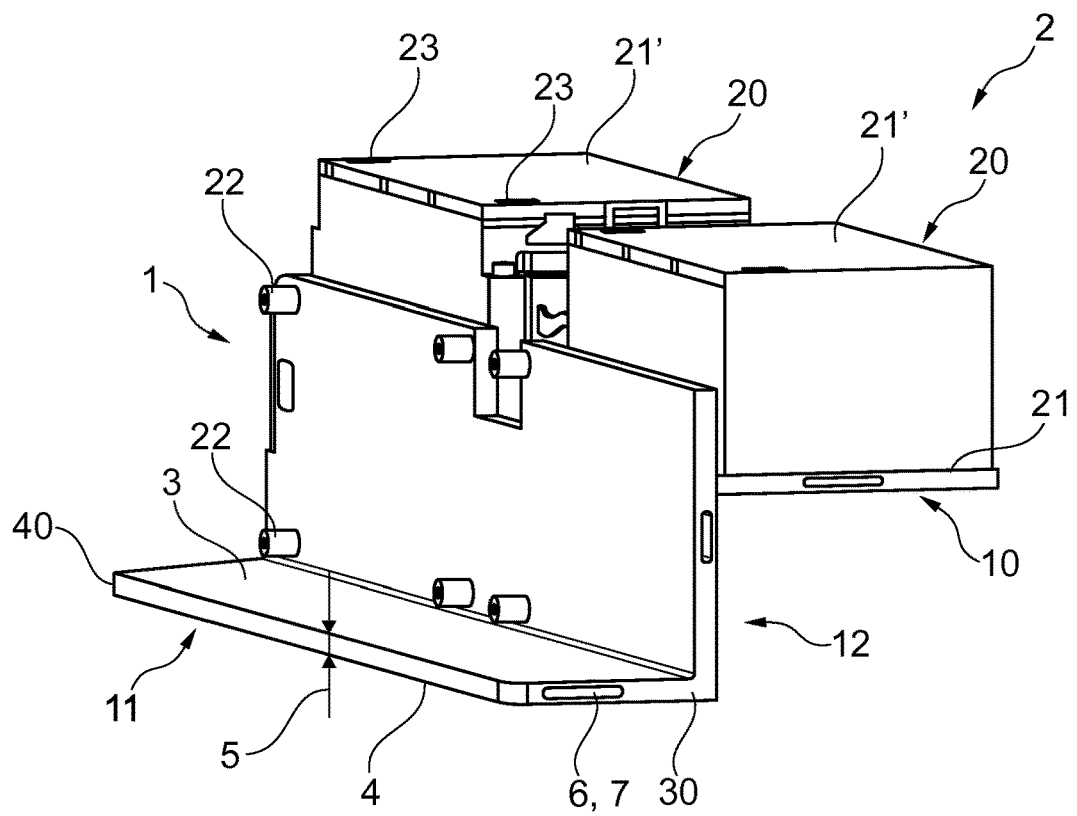

of the channel (6, 61, 62), the external surfaces (3, 4) of the heat exchange plate (10, 11, 12) are separated from one another by a distance (53) less than the thickness (5).

8 Claims, 4 Drawing Sheets

(51) Int. Cl.
    *H01M 10/6556*      (2014.01)
    *B60K 1/00*      (2006.01)
    *H01M 10/625*      (2014.01)

(58) Field of Classification Search
    USPC ........................................................ 180/54.1
    See application file for complete search history.

(56) References Cited

U.S. PATENT DOCUMENTS

| | | | | |
|---|---|---|---|---|
| 6,340,066 | B1* | 1/2002 | Dettling | B01D 53/02 96/228 |
| 9,711,828 | B2* | 7/2017 | Heise | H01M 10/613 |
| 2013/0280596 | A1* | 10/2013 | Lee | H01M 50/105 429/176 |
| 2014/0050953 | A1* | 2/2014 | Yoon | H01M 50/227 429/82 |
| 2016/0097598 | A1* | 4/2016 | Hirsch | H01M 10/6556 165/175 |
| 2016/0204486 | A1* | 7/2016 | Kenney | H01M 10/617 29/890.03 |
| 2016/0315365 | A1* | 10/2016 | Vanderwees | H01M 10/6557 |
| 2017/0317394 | A1 | 11/2017 | Obrist et al. | |
| 2017/0324132 | A1* | 11/2017 | Kenney | H01M 50/24 |

FOREIGN PATENT DOCUMENTS

| | | |
|---|---|---|
| CN | 102057532 A | 5/2011 |
| CN | 103219559 A | 7/2013 |
| CN | 106935932 A | 7/2017 |
| DE | 102012005870 A1 | 9/2013 |
| WO | 2013139905 A1 | 9/2013 |
| WO | 2016109881 A1 | 7/2016 |

OTHER PUBLICATIONS

International Search Report and Written Opinion corresponding to International Application No. PCT/FR2018/053450, dated Mar. 22, 2019 (11 pages).

* cited by examiner

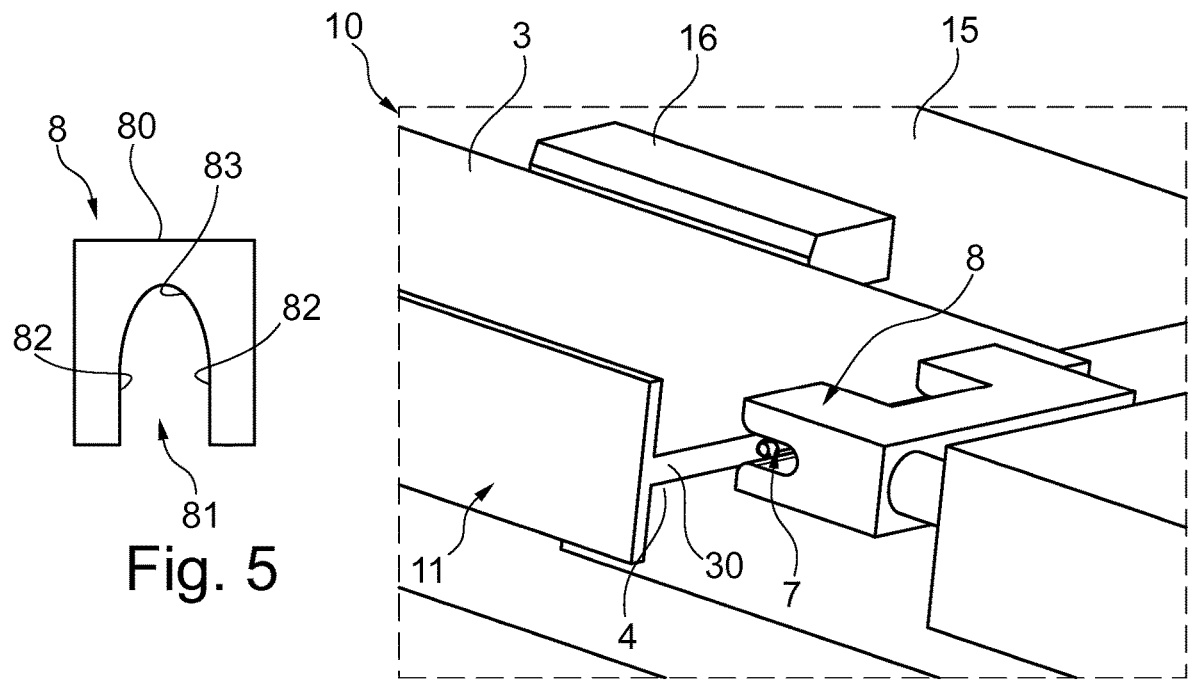
Fig. 5
Fig. 6
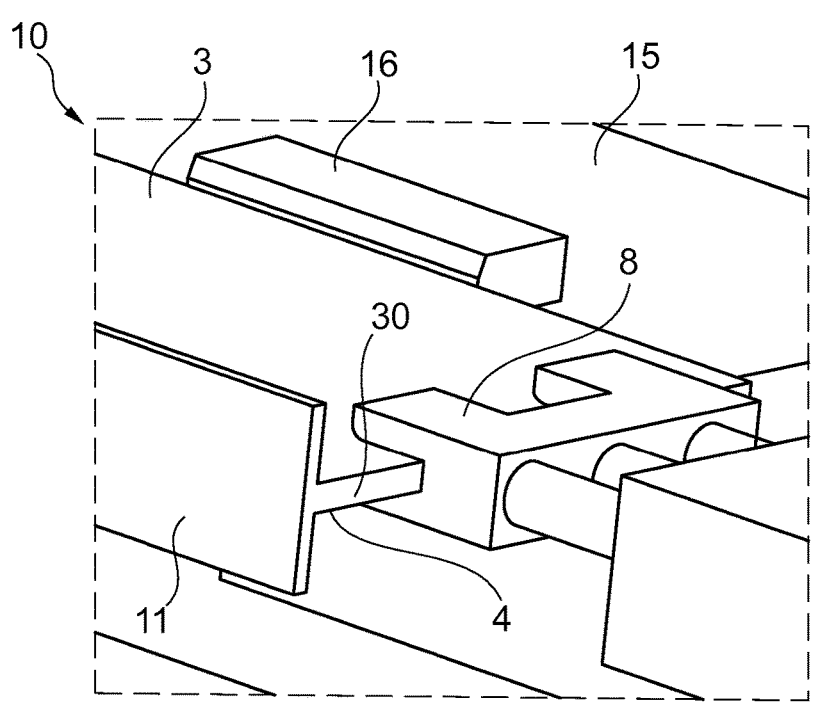
Fig. 7

STRUCTURE FOR HEAT TREATMENT OF AN ELECTRICAL STORAGE DEVICE FOR A MOTOR VEHICLE

The invention relates to the field of systems for heat treatment of an electrical storage device for motor vehicles. It more particularly concerns structures intended for heat treatment of an electrical storage device of such heat management systems.

Electric and hybrid vehicles are routinely equipped with an electrical storage device. This kind of electrical storage device consists of an assembly of electrical modules themselves consisting of an assembly of electrochemical cells.

To ensure the autonomy, performance and reliability of this kind of electrical storage device it is necessary for the electrical storage device to undergo heat treatment. Heat treatment of the electrical storage device aims to maintain the temperature of the electrical modules that constitute it at a temperature between approximately 20° C. and approximately 40° C. inclusive. In fact, if the temperature of an electrical module is too low the capacity of its electrochemical cells decreases and if the temperature of an electrical module is too high the service life of its electrochemical cells is degraded. To reduce this heat treatment it is known to use a heat treatment device comprising a heat exchange plate positioned directly in contact with an electrical module of the electrical storage device through which a heat transport fluid passes.

There are known heat treatment devices formed by at least one plate type heat exchanger placed under an electrical module to be in direct contact with the latter. This kind of plate type heat exchanger is formed by two pressed metal plates brazed to one another in order to define between them one or more circuits formed of heat transport fluid flow channels.

Depending on the heat treatment required, the fluid flowing through the plate type heat exchanger is used, alternately, to evacuate heat energy emitted by the electrical module or to input heat energy to the electrical module.

To form these circuits it may be necessary to close in sealed manner the end discharging to the outside of one of the flow channels of one of these circuits. To this end the plates are abutted at their perimeter so as to be fastened together in a sealed manner.

This kind of plate type heat exchanger has the disadvantage of requiring a complex assembly process.

An object of the present invention is to alleviate at least the aforementioned disadvantage and to propose a particular arrangement of a structure intended for the heat treatment of an electrical storage device for motor vehicles including a heat exchange plate forming a heat exchanger that is simpler to manufacture.

To this end, the invention consists in a structure for the heat treatment of an electrical storage device for a motor vehicle, the structure including at least one heat exchange plate intended to be in contact with the electrical storage device and having a thickness defined by two external surfaces, the heat exchange plate comprising at least one channel formed in its thickness and opening at at least one end into the thickness of the heat exchange plate. According to the invention, at the level of the end of the channel, the external surfaces of the heat exchange plate are separated from one another by a distance less than the thickness.

The distance measured between these two external faces is therefore less than the thickness of the heat exchange plate measured in a direction parallel to that for measuring the distance, in line with the channel and external to the end of that channel.

This kind of structure is intended to support the electrical storage device, that is to say to be the mechanical element that takes the weight of the electrical storage device.

The structure is advantageously a metal structure. The structure is even more advantageously made of synthetic material. According to one of these variants, the structure may be a carbon fiber based synthetic structure.

The electrical storage device consists of an assembly of electrical modules themselves consisting of an assembly of electrochemical cells. The purpose of the electrical storage device is to supply power to an electric motor. A motor vehicle equipped with this kind of electrical storage device may be driven by the electromotive force of the electric motor or motors to which it is coupled.

The channel is formed within the thickness of the heat exchange plate. This is what distinguishes the heat exchange plate of the invention from a heat exchange plate formed by two pressed metal plates brazed one against the other to define a channel.

The heat exchange plate advantageously forms a heat exchanger favoring the heat treatment of the electrical storage device. To this end, a heat transport fluid flows through the channel. The fluid then exchanges heat with the heat exchange plate. It will then be clear that the heat exchange plate enables heat transfer by conduction between the fluid and the electrical storage device.

At the level of the end of the channel the external faces are brought closer to one another by deforming them. Accordingly, with the exception of the end of the channel, the thickness of the heat exchange plate is constant. Bringing the external faces of the heat exchange plate closer to one another in this way at the level of the end of the channel therefore enables the addition of a closure member to close the channel.

According to one feature of the invention, the end of the channel is closed in a sealed manner. It will be clear that the sealed closure of the end of the channel is effected after the external faces of the heat exchange plate are moved closer to one another at the level of the end.

According to another feature of the invention, the channel comprises opposite first and second internal faces and at the level of the end these first and second internal faces are separated by approximately 1 millimeter and interconnected by a weld bead.

According to another variant of the invention, the channel is bordered by opposite first and second internal faces and at the level of the end these first and second internal faces are in contact with one another and interconnected without adding material.

The end of the channel is advantageously sealed by welding.

According to one feature of the invention, the heat exchange plate is plane. To be more specific, the heat exchange plate is formed by the two opposite external faces. The two external faces of the heat exchange plate define between them the thickness of said plate. That thickness is sufficient to form the channel there. Moreover, the heat exchange plate extends between at least two opposite sides perpendicular to said external faces, the channel being formed from one of those sides. The end of the channel discharges into one or both of those sides.

According to one feature, the heat exchange plate is produced by extrusion of material.

According to one particular feature, the end of the channel is in a plane distinct from a plane in which extends the side where the end of the channel is formed.

The channel is advantageously rectilinear. In other words, the channel extends along a straight axis.

According to one particular feature of the invention, the heat exchange plate is mostly made of aluminum. This kind of plate then enables reduction of the weight of the structure mounted on the vehicle whilst optimizing the exchange of heat by thermal conduction between the fluid flowing in the channel and the electrical storage device. The heat exchange plate is advantageously made of aluminum alloy. Even more specifically, the heat exchange plate is made of aluminum. The entirety of the structure may also be made of aluminum or of an aluminum alloy.

According to one variant embodiment of the invention, the heat exchange plate comprises two walls that border the channel, at least one of these walls, and advantageously both of them, having a thickness between 2 millimeters and 6 millimeters inclusive.

In particular, the thickness of the heat exchange plate measured away from the end of the channel is between 10 millimeters and 20 millimeters inclusive.

The channel is advantageously formed in a length of said heat exchange plate. When the structure comprises this variant embodiment, the heat exchange plate is oriented lengthwise perpendicularly to the direction of advance of the vehicle.

The channel is advantageously formed within the thickness of the heat exchange plate from a first side to a second side, the first side and the second side being opposite one another and the channel discharging at one end onto each of those sides.

According to one embodiment of the invention, the structure comprises two heat exchange plates, the heat exchange plates together forming a "T". This kind of "T" shape enables each of the heat exchange plates to be in contact with electrical modules of the electrical storage devices on two perpendicular flanks of the latter and thus to optimize the heat treatment of the electrical storage device, more specifically of its electrical modules.

The structure advantageously comprises three heat exchange plates, those heat exchange plates together forming a step-shaped structure. This particular shape enables more electrical modules of the electrical storage device to be placed in contact with at least one heat exchange plate.

The structure advantageously forms a structural element of a chassis or a body of the vehicle. More specifically, the structure forms a structural element of a subframe of the chassis or of the body of the vehicle.

In another aspect, the invention consists in a system for heat treatment of a storage device comprising the structure conforming to any one of the above features and an electrical storage device as defined above.

According to another aspect the invention consists in a press tool for the deformation of one end of a channel formed between two external faces defining a thickness of a heat exchange plate of a structure conforming to any one of the above features. According to the invention the tool includes a body, in particular a metal body, in which is formed an open interior profile including two plane surfaces joining via a curved surface, the plane surfaces being configured to receive in corresponding relationship and at least in part the external faces of the heat exchange plate so as to guide the latter toward the curved surface and to bring them closer to one another at the level of the end of the channel.

This kind of tool enables deformation of the thickness of the heat exchange plate at the level of the end in order to move close to one another the external faces of the heat exchange plate.

According to one feature of the invention, the plane surfaces of the tool are adapted to receive the external faces of said plate between them without clearance. This feature makes it possible to ensure that each of the external faces of the heat exchange plate is guided by the tool symmetrically with respect to one another.

According to another aspect, the invention consists in a method for deformation of an end of a channel formed between two external faces defining a thickness of a heat exchange plate of a structure as defined above, the deformation method comprising a step of deformation of the end of the channel during which the external faces defining the thickness of said plate are brought closer to one another at the level of the end.

The external faces of the heat exchange plate are advantageously brought closer to one another at the level of the end by the tool described in the present document.

The method even more advantageously comprises the following steps even before the deformation step:

a step of positioning the heat exchange plate during which the heat exchange plate is positioned so that the end of the channel faces the open interior profile of the tool;

a step of bringing the tool into contact during which the thickness of the heat exchange plate is disposed between the two plane surfaces of the open interior profile of the tool.

According to a variant embodiment of the method of the invention, in the step of deformation of the end of the channel the external faces are brought closer to one another at the level of the end by the curved surface of the profile of the tool.

In the step of deformation of the end of the end of the channel this bringing closer to one another is advantageously effected by pressing the tool against the thickness of said plate.

The step of deformation of the end of the channel advantageously continues until the external faces are sufficiently close to one another to close said end in a sealed manner.

In the step of deformation of the end of the channel at the level of the end, internal faces of the channel are advantageously brought closer to one another until distant from one another by approximately 1 millimeter.

Regardless of the situation, a welding step may be carried out to weld the end of the channel once the external faces have been brought closer to one another.

Figure 2:
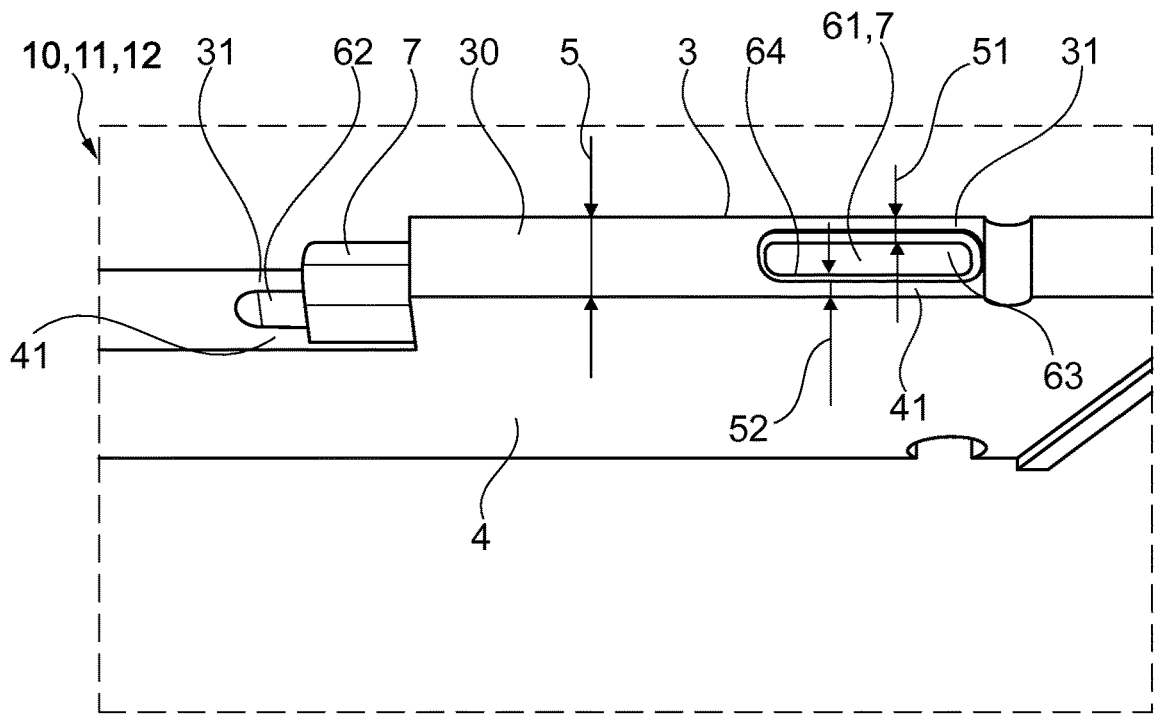
Figure 3:
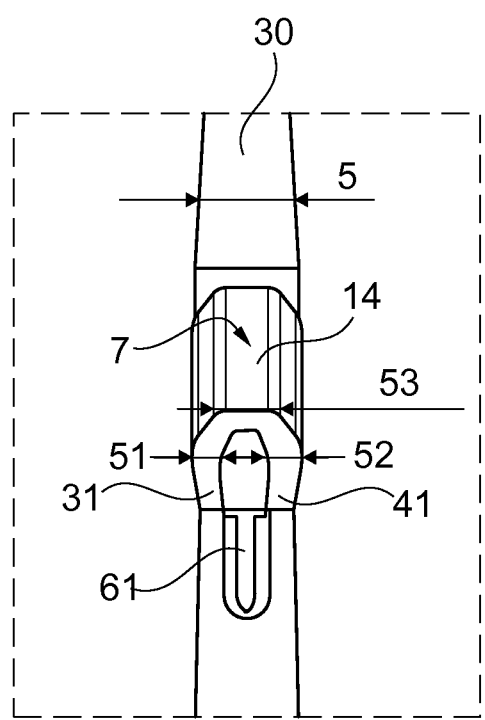
Figure 4:
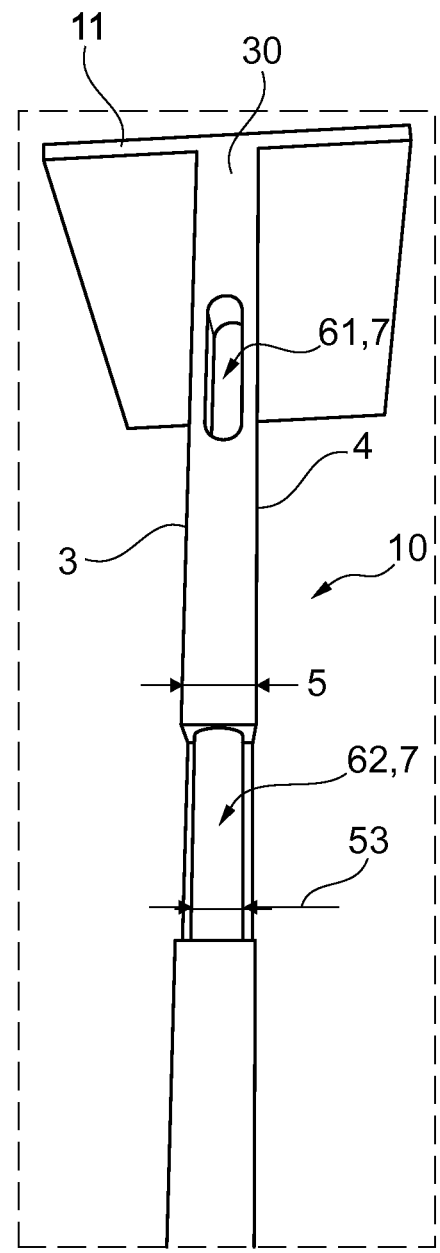
Figure 8:
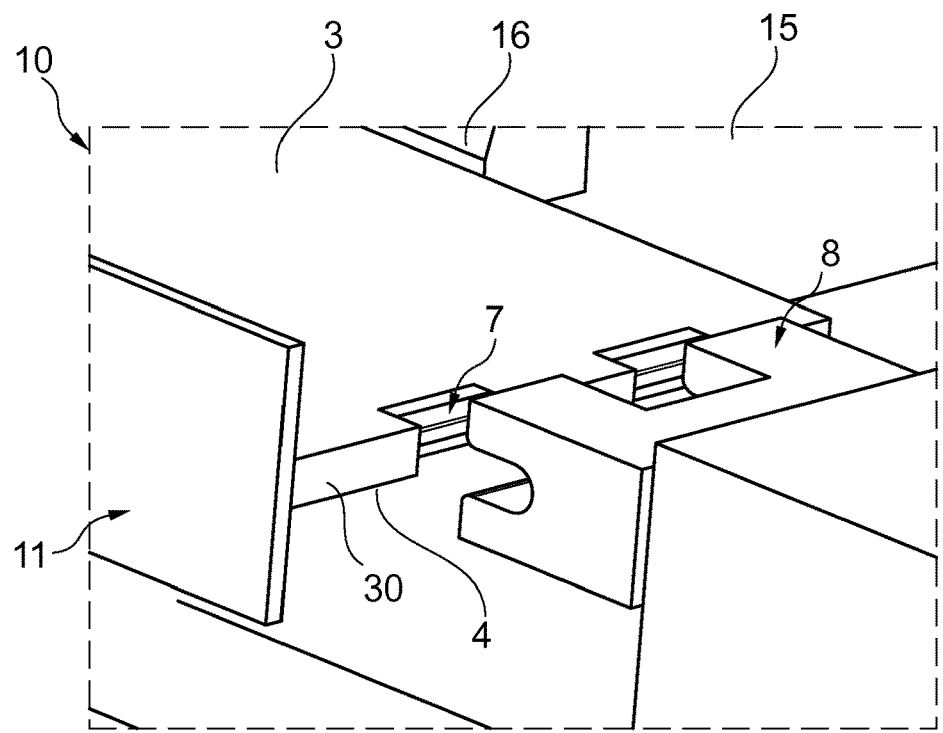
Figure 9:
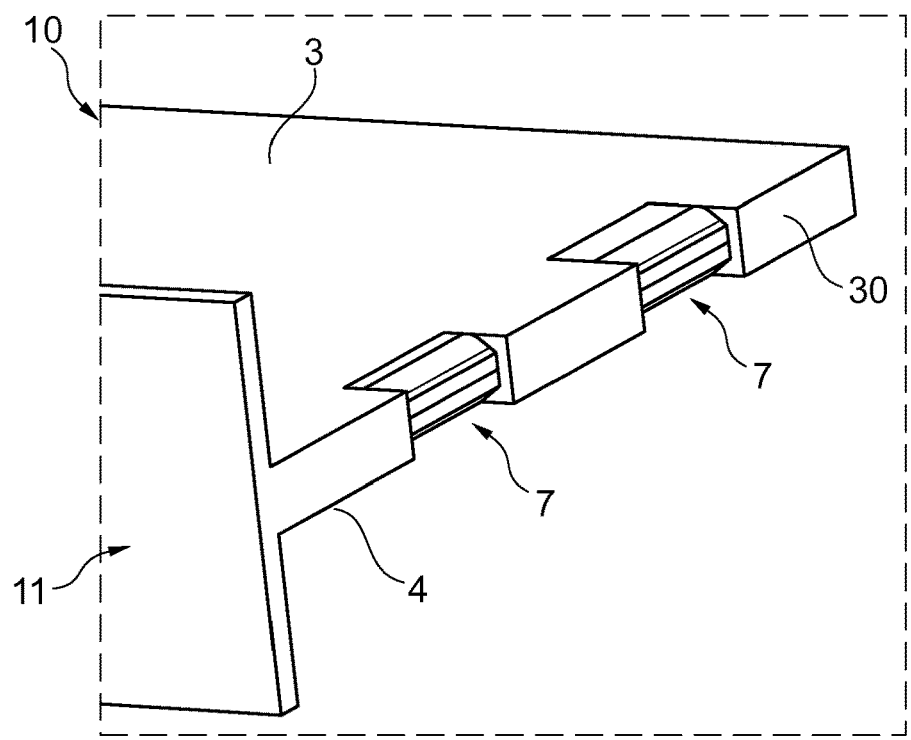

Other features, details and advantages of the invention will emerge more clearly on reading the description given hereinafter by way of indication and with reference to the drawings, in which:

FIG. 1 is a view in section and in perspective of a structure according to a first embodiment of the invention on which are mounted electrical modules of an electrical storage device for motor vehicles, FIG. 2 is a perspective view of a heat exchange plate including two channels, with one of the channels represented cut away to show better the bringing closer to one another of the external faces of the plate at the level of its end with a view to closing it and the other channel represented open to show better the end of a channel before its closure, FIG. 3 is a lateral view of FIG. 2 showing the cut channel, FIG. 4 shows a structure according to a second embodiment, FIG. 5 is a sectional view of a press tool enabling deformation of the end of the channel, FIG. 6 shows a step of positioning the tool from FIG. 5 relative to the heat exchange plate in the second embodiment, FIG. 7 shows a step of bringing the tool from FIG. 5 into contact between two external walls of the heat exchange plate from FIG. 6, FIG. 8 shows the withdrawal of the tool and the state of the external walls of the heat exchange plate at the level of the end of the channel after a step of deformation of the latter has been carried out, FIG. 9 represents the heat exchange plate each channel of which is closed at its end.

In FIG. 1 there has been represented a structure 1 according to a first embodiment of the invention. The structure 1 is represented in a sectional view at the righthand end of the structure 1. The structure 1 includes a plurality of heat exchange plates 10, 11, 12, here three heat exchange plates 10, 11, 12 of plane shape, hereinafter termed plates, together forming a step-shaped structure. This kind of structure 1 is advantageously in one piece. The structure 1 is preferably made mostly of aluminum. The structure 1 is even more preferably made of aluminum alloy. Of these three heat exchange plates 10, 11, 12, first and second heat exchange plates 10, 11 are disposed in distinct planes and parallel to one another whilst a third heat exchange plate 12 mechanically connects the first heat exchange plate 10 and the second heat exchange plate 11 to one another. The third heat exchange plate 12 extends for example in a plane perpendicular to the plane of the first heat exchange plate and/por to the plane of the second heat exchange plate 11.

This kind of structure 1 is intended to support an electrical storage device 2 consisting of an assembly of electrical modules 20 themselves consisting of an assembly of electrochemical cells. The function of this kind of electrical storage device 2 is to supply power to at least one electric motor that drives the motor vehicle. It will be clear that a motor vehicle equipped with this kind of electrical storage device 2 can be driven by the electromotive force of the electric motor or motors to which it is coupled.

At least one heat exchange plate 10, 11, 12 advantageously forms a heat exchanger favoring heat treatment of the electrical storage device 2.

To this end the electrical modules 20 are advantageously disposed on the structure 1 to come into thermal contact with the heat exchange plates 10, 11, 12. As shown, two electrical modules 20 are therefore mounted on the first heat exchange plate 10. These two electrical modules 20 are advantageously fixed to the first plate 10. In the assembled state at least a first face 21 of these electrical modules 20 is pressed against the first plate 10. The third heat exchange plate 12 is represented with no electrical modules 20 to show better means 22 for fixing the electrical modules 20 to the latter. These fixing means 22 are therefore represented as formed by studs previously mounted on the third plate. These studs advantageously enable guidance of the positioning of the electrical modules 20 against the third plate 12. To hold the electrical modules 20 against their respective plate 10, 12 these electrical modules 20 comprise through-openings 23 from a second face 21' of these electrical modules 20 opposite the first face 21. Fixing screws are then inserted from this second face 21' through the through-openings 23 to interengage with bores formed in the studs. Without this being limiting on the invention, it will be clear that, according to the first embodiment, the electrical modules 20 are mounted in exactly the same manner on the first plate 10 and on the third plate 12. In this configuration the second plate 11 is able to support at least part of the weight of the electrical modules 20 mounted on the third plate 12.

Here the structure 1 is intended to form a structural element of a chassis or a body of the vehicle. To be more specific, the structure 1 forms a structural element of a subframe of the chassis of the vehicle. The structure 1 may therefore form a beam that extends between two longitudinal members of the chassis or between two crossmembers of that chassis. It should be noted that in the assembled state of the structure 1 on the vehicle a first exterior face 3 of each of the plates 10, 11, 12 is directed toward the exterior of the vehicle and a second external face 4 of those plates 10, 11, 12, on which the electrical modules 20 are placed, is directed toward the interior of the vehicle. With reference to what has been stated above, it will be clear that the first external face 3 of the first plate 10 and of the third plate 12 is in contact with a face 21 of the electrical module 20 that it supports.

As represented in the FIG. 1 sectional view, each plate 10, 11, 12 includes two external faces 3, 4 defining its thickness 5. The two external faces 3, 4 are more specifically the first external face 3 and the second external face 4 defined above.

Moreover, at least one of the plates 10, 11, 12 and advantageously each plate 10, 11, 12 includes a channel 6 formed within its thickness 5 and discharging at at least one end 7 within the thickness 5 of the plate 10, 11, 12. The two external faces 3, 4 of each plate 10, 11, 12 are themselves defined longitudinally by at least two sides 30, 40. It is understood that the end 7 of the channel 6 discharges on one of these sides 30, 40.

The channel 6 of each plate 10, 11, 12 is rectilinear to extend along a straight lengthwise axis of the plate 10, 11, 12. The plate 10, 11, 12 comprising the channel formed in this way is advantageously oriented with its length perpendicular to the direction of advance of the vehicle. This kind of orientation of the plate 10, 11, 12 perpendicularly to the direction of advance of the vehicle enables crushing of the channel 6 to be limited.

A heat transport fluid flows through the channel 6. The fluid then exchanges heat with the heat exchange plate 10, 11, 12. It will therefore be clear that the heat exchange plate 10, 11, 12 enables transfer of heat between the fluid and the electrical modules 20 of the electrical storage device 2.

It should be noted that the heat exchange plates 10, 11, 12 are not limited to including a single channel 6. At least any one of these heat exchange plates 10, 11, 12 may comprise a further channel 6 as described.

In FIG. 2 there any one of the heat exchange plates 10, 11, 12 has been represented separately from the structure 1 in order better to represent the inventive concept of the present invention.

In a similar way, the heat exchange plate 10, 11, 12 is plane and defines a thickness 5 between two external faces 3, 4. Here the plate 10, 11, 12 includes two channels 61, 62, namely a first channel 61 and a second channel 62, formed within its thickness 5. It will be clear that the two channels 61, 62 are created between the two external faces 3, 4. These two channels 61, 62 discharge via at least one end 7 on at least one side 30 of the plate 10, 11, 12, that side 30 of the plate 10, 11, 12 being perpendicular to the two external faces 3, 4. For example, the plate or plates 10, 11, 12 and the channels 61, 62 are obtained by extrusion of material. When they are formed, these channels 61, 62 define within the thickness 5 of the plate 10, 11, 12 the two walls 31, 41.

At the level of the second channel 62 the plate 10, 11, includes two walls 31, 41, namely a first wall 31 and a second wall 41, that border the channel 62. The thickness 5 of the plate 10, 11, 12 is then formed by a thickness 51, 52 of each wall 31, 41 and by the channel 62 itself. According to this embodiment, the thickness 5 of the plates 10, 11, 12 is between 10 millimeters and 20 millimeters inclusive. To be more specific, the thickness 51, 52 situated on either side of the channel is between 2 millimeters and 6 millimeters inclusive.

The walls 31, 41 bordering the channel 62 are defined by the external faces 3, 4 of the plate 10, 11, 12 and by first and second internal faces 63, 64 on opposite sides of the channel 62. The thickness 51 of the first wall 31 is therefore defined by the first external face 3 and the first internal face 63 and the thickness 52 of the second wall 41 is defined by the second external face 4 and the second internal face 64.

The first channel 61 is represented open before its closure and the second channel 62 is represented sectioned after its closure. Where the second channel is more particularly concerned, its sectioned representation enables the interior of the second channel 62 and the exterior of that second channel 62 to be shown at the level of its closure.

The second channel 62 is closed at the level of its end 7 by bringing the two external faces 3, 4 closer to one another so as to be contained within the thickness 5 of the plate 10, 11, 12. In other words and as shown in FIG. 3, when the external faces 3, 4 are brought closer to one another at the level of the end 7 of the second channel 62 by a distance 53 less than the thickness 5. It will then be clear that a total thickness 53 between the external faces 3, 4 is less than the thickness 5 of the plate 10, 11, 12.

At the level of the end 7 of the second channel 62 the external faces 3, 4 are brought closer to one another by deforming them. Accordingly, with the exception of the end 7 of the channel 6 or of the first or second channel 61, 62, the thickness 5 of the plate 10, 11, 12 remains constant. This kind of bringing the external faces 3, 4 of the plate 10, 11, 12 closer together at the level of the end 7 of the second channel 62 therefore makes it possible to avoid adding a closure member to effect the closure of that second channel 62. Moreover, it should be noted that the deformation of the walls 31, 41 enabling the external faces 3, 4 to be brought closer to one another at the level of the end 7 has the consequence of placing the end 7 of the second channel 62 in a plane distinct from a side 30, 40 of the plate 10, 11, 12 from which it is formed.

In this closer together state of the external faces 3, the end 7 of the second channel 62 is closed in sealed manner. To this end, at the level of the end 7 the external faces 3, 4 are brought sufficiently closer together until they are spaced from one another so as to be able to seal the end 7. The external faces 3, 4 are then advantageously brought closer to one another leaving a gap of approximately 1 millimeter between the two walls 31, 41. The seal is effected by welding, for example. To be more specific, the weld bead 14 may be produced to close the second channel 62 in sealed manner at the level of this end 7.

The sealed closure may nevertheless be produced by electrowelding with no addition of material. To this end the walls 31, 41 are brought into contact with one another at the level of the end 7.

As shown in FIG. 4 the structure 1 comprises two heat exchange plates 10, 11, the heat exchange plates 10, 11 together forming a "T". This kind of shape enables each of the heat exchange plates 10, 11 to be in contact with electrical modules 20 of the electrical storage device 2 and thus to optimize the heat treatment of the electric modules 20 that they support. It will be clear that the heat exchange plate 11 may comprise a channel 6 or a plurality of channels 61, 62.

To enable this bringing of the external faces 3, 4 closer to one another as defined above, there is used a press tool 8 that is shown in FIG. 5. This press tool is mounted on a press able to exert a plurality of tons on the part of the heat exchange plate 10, 11, 12 that it has to shape, the plate 10, 11, 12 being one according to either of the first and second embodiments.

The tool 8 includes a body 80 in which is formed an open interior profile 81 including two plane surfaces 82 joining via a curved surface 83, the plane surfaces being configured to receive in corresponding relationship and at least in part the external faces 3, 4 of the heat exchange plate 10, 11, 12 at the level of the end 7 of the channel 6. When the plate 10, 11, 12 is received in the tool 8 the external faces 3, 4 of the plate 10, 11, 12 are held without clearance between the plane surfaces 82. The plane surfaces 82 of the tool 8 are designed to guide the end 7 toward the curved surface 83. When the end 7 of the channel 6 arrives at the level of the curved surface 83 of the tool 8 the two external faces 3, 4 of the plate 10 are deformed to espouse the shape of the curved surface 83 until they arrive at the apex of the curved surface 83. At this apex of the curved surface 83 the two walls 31, defining the channel 6 are brought closer to one another so as to be separated by approximately 1 millimeter or in contact with one another, depending on the closure mode envisaged. Starting from the apex of the curved surface 83, the end 7 of the channel 6 is pressed by the tool 8 to be bent and therefore to maintain the deformation of the walls of the plate 10, 11, 12 at that end 7.

The external faces of the plate 10, 11, 12 are brought closer to one another at the level of the end 7 by means of a deformation process. That process includes a step of deformation of the end 7 of the channel 6 during which the external faces 3, 4 defining the thickness 5 of the plate 10, 11, 12 are brought closer to one another at the level of the end 7 of the channel 6.

When the process is carried out by a press tool 8 as described above, during this deformation step the external faces 3, 4 of the plate 10, 11, 12 will espouse the shape of the curved surface 83 until they reach its apex.

As shown in FIG. 6, the process may, in a first step before the deformation step, comprise a step of positioning the heat exchange plate 10 during which the heat exchange plate 10 is positioned so that the end 7 of one of the channels 6 faces the open interior profile 81 of the tool 8. The plate 10, 11, 12 is advantageously disposed on a platen 15 butted up against a stop 16.

In FIG. 7, after this positioning step, in a second step, the process comprises a step of bringing the tool 8 into contact during which the thickness 5 of the heat exchange plate 10 is disposed between the two plane surfaces 82 of the open interior profile 81 of the tool 8. The tool 8 is then advanced to guide the external faces of the plate 10 toward the curved surface 83, as described above.

FIG. 8 shows the withdrawal of the tool 8 after the step of deformation of the end 7 of the channel 6, which continues until the external faces are sufficiently close to one another to close said end 7 in sealed manner.

FIG. 9 shows the plate 10 in which, at the level of each end 7, the faces 3, 4 of the plate 10 have been brought closer to one another. It will moreover be clear that the tool 8 may advantageously be designed to close simultaneously the end 7 of a plurality of channels 6 on the same side 30 of the plate 10.

Of course, the features, variants and various embodiments of the structure and/or of its heat exchange plates may be associated with one another in various combinations if they are not incompatible or mutually exclusive. There may in particular be imagined variants of the invention comprising only a selection of the features described hereinafter separately from the other features described if that selection of features is sufficient to confer a technical advantage or to distinguish the invention from the prior art.

The invention claimed is:

1. A structure for the heat treatment of an electrical storage device for a motor vehicle, the structure comprising:
    at least one heat exchange plate configured to be in contact with the electrical storage device and having a thickness defined by two external surfaces,
    the heat exchange plate comprising at least one channel formed in its thickness and opening at at least one end of the channel into the thickness of the heat exchange plate,
    wherein, at the level of the end of the channel, the external surfaces of the heat exchange plate are separated from one another by a distance less than the thickness, and
    wherein the channel is defined by opposite first and second internal faces, and
    wherein, at the level of the end, the first and second internal faces are interconnected by a weld bead.

2. The structure as claimed in claim 1, wherein the structure supports the electrical storage device.

3. The structure as claimed in claim 1, wherein the end of the channel is closed in sealed manner.

4. The structure as claimed in claim 1, wherein, at the level of the end, the first and second internal faces are separated by approximately 1 millimeter.

5. The structure as claimed in claim 1, wherein the heat exchange plate is produced by extrusion of material.

6. The structure as claimed in claim 1, wherein the heat exchange plate is mostly made of aluminum.

7. The structure as claimed in claim 1, in which the heat exchange plate comprises two walls that border the channel, at least one of these walls having a thickness between 2 millimeters and 6 millimeters inclusive.

8. The structure as claimed in claim 1, further comprising:
    three heat exchange plates together forming a step-shaped structure.

* * * * *